United States Patent [19]

Gupta et al.

[11] Patent Number: 5,057,184

[45] Date of Patent: Oct. 15, 1991

[54] LASER ETCHING OF MATERIALS IN LIQUIDS

[75] Inventors: Arunava Gupta, Valley Cottage, N.Y.; Belgacem Haba, Wilaya d'El-Oued, Algeria; Brian W. Hussey, Garrison; Lubomyr T. Romankiw, Briarcliff Manor, both of N.Y.

[73] Assignee: International Business Machines Corporation, Armonk, N.Y.

[21] Appl. No.: 505,380

[22] Filed: Apr. 6, 1990

[51] Int. Cl.$^5$ .............. B44C 1/22; C03C 15/00; C03C 25/06; C23F 1/02

[52] U.S. Cl. .............. 156/637; 156/642; 156/643; 156/654; 156/659.1; 156/662; 156/663; 156/667; 156/345; 219/121.69; 219/121.85

[58] Field of Search .............. 156/637, 639, 642, 643, 156/654, 655, 656, 657, 659.1, 662, 663, 667, 345; 219/121.68, 121.69, 121.8, 121.84, 121.85; 252/79.2, 79.5

[56] References Cited

U.S. PATENT DOCUMENTS 4,876,690  10/1989  Nishida et al. .............. 372/56
4,904,340  2/1990  Miracky et al. .............. 156/643

OTHER PUBLICATIONS

F. V. Bunkin et al, "Si Etching Affected by IR Laser Irradiation" Appl. Phys., vol. A37, 117–119, 1985.
T. Shiosaki et al, "Laser Micromachining of a Modified PbTiO$_3$ Ceramics in KOH Water Solution", Jpn. J. Appl. Phy. vol. 22, Suppl. 22—2, 109-112 (1983).
K. Koyabu et al, "Laser—assisted Etching for Al$_2$O$_3$/-TiC Ceramics with Nd:YAG Laser and KOH Solution", J. Cer. Soc. of Jpn, vol. 96, C—39-C—43.
E. K. Yung et al, "Laser—Assisted Etching of Manganese—Zinc—Ferrite" J. Electrochem. Soc., vol. 136, No. 3, 665–673, Mar., 1989.
R. J. von Gutfield et al, "Laser Enhance Etching in KOH", Appl. Phys. Lett., vol. 40(4) Feb. 15, 1982, pp. 352–354.
N. Morita et al, "Pulsed Laser Processing of Ceramics in Water", Appl. Phys. Lett., vol. 52(23), Jun. 6, 1988, 1965–1966.
V. G. Vol'ter et al, "Low—pressure pulsed CO$_2$ laser and its use for Scribing Pyroceramic Plates", Sov. J. Opt. Technol, vol. 45(6) Jun., 1978 pp. 376–378.

Primary Examiner—William A. Powell
Attorney, Agent, or Firm—Philip J. Feig

[57] ABSTRACT

Laser etching of a substrate in a liquid is accomplished by laser induced sonic cavitation at the substrate surface. The preferred substrate is laser energy absorbing and has a finite melting temperature. The preferred liquid is an organic or inorganic inert liquid which does not chemically react with the substrate at room temperature. The laser is preferably a copper vapor laser but a chopped beam cw argon ion laser or a YAG laser adjusted to a low power output sufficient to avoid the formation of a recast layer can also be used. The laser parameters are adjusted for causing the growth and collapse of bubbles at the substrate surface. The laser etching has particular application in the fabrication of rails in magnetic head sliders and dicing of Al$_2$O$_3$—TiC, TiC, SiC, Si/SiO$_2$, and laser energy absorbing metal and metal oxides.

42 Claims, 2 Drawing Sheets

LASER ETCHING OF MATERIALS IN LIQUIDS

BACKGROUND OF THE INVENTION

The present invention relates to laser etching of a substrate in liquid. Specifically, the invention relates to etching of ceramic, semiconducting and metallic substrates by means of laser induced sonic cavitation. The invention has particular applicability to the machining of slots, rails and grooves in $Al_2O_3$—TiC ceramic, and ferrites in magnetic head sliders.

Laser processing, particularly deposition and etching of a variety of materials, including metals, ceramics, and polymers, which are of interest for electronic device fabrication and for packaging applications, have been demonstrated over the last decade. However, when practicing laser etching or machining, in air or in liquids at high fluence (power density) it is difficult to avoid the formation of a recast layer and the appearance of cracks in the etched substrate. The presence of such "frozen lava" and accompanying defects significantly hinders some functions of the ceramic substrate and therefore limit the use of laser processing with ceramic materials.

A known method of laser etching is micromachining using a combination of laser energy and a chemically reacting liquid etchant in which the function of the laser is to locally heat the substrate and thus locally accelerate the chemical reaction. The importance of the submerged liquid laser enhanced process is demonstrated by its ability to etch brittle ceramic materials, semiconductors and metals with laser energy which would otherwise crack and oxidize the same material when etched in air and would locally alter its properties. Commonly used etchants include aqueous alkaline or acid solutions of KOH, NaOH, $HNO_3$, $H_3PO_4$, HCL and the like. The etch rates vary depending upon the particular material to be etched, type and concentration of chemical solution used, laser wave length and fluence (power density). While alkaline hydroxides or acids in solution are advantageous due to their flexibility for etching, at the same time the very same solutions are disadvantageous because even at room temperature they tend to react with the substrate being etched. Additionally, if the substrate is used as a carrier of metallic devices, components or conductors, such as for instance thin film heads, they may react with the materials of which the device is constructed and destroy it.

In practice, the laser beam is focused to a micron-size spot which is used for etching the material by direct writing. Etching of various materials has been reported. For example, the use of either KOH or NaOH to laser-machine various materials, including $PbTiO_3$, $Al_2O_3$—TiC and $Mn_{0.6}Zn_{0.4}Fe_{2.3}O_4$ has been reported in articles by F. Bunkin et al, entitled "Si Etching Affected by IR Laser Irradiation", in Appl. Phys., vol. A37, 117 (1985); T. Shiosaki, et al, entitled "Laser Micromaching of a Modified $PbTiO_3$ Ceramics in KOH Water Solution", in Jpn. J. Appl. Phys., Suppl. 22-2, 109 (1983); K. Koyabu et al, entitled "Laser-Assisted Etching for $Al_2O_3$/TiC Ceramics Using Nd:YAG Laser and KOH Solution", in J. Jpn. Soc. Precis. Eng., vol. 53, 1027 (1987) and E.K. Yung, et al, entitled "Laser-Assisted Etching of Manganese-Zinc-Ferrite", in J. Electrochem. Soc., vol. 136, 665 (1989). In each of these articles, CW lasers are used with various temperature distributions depending upon the wavelength, absorption depth and material thermal properties. Etching of silicon and $Al_2O_3$—TiC ceramic using concentrated KOH solution and a CW argon laser is described in an article by von Gutfeld et al entitled "Laser Enhanced Etching in KOH", in Appl. Phys. Lett., Vol. 40, 352 (1982).

As noted above, the use of alkaline hydroxide solutions even at room temperature may demonstrate some varied etching effect on the material to be etched, and the function of the laser is to locally accelerate the reaction and provide local very rapid accelerated etching. If the substrate material has fabricated on it devices which react with the alkaline hydroxide or acid, then even if the substrate is hardly affected by the alkaline hydroxide at room temperature, the devices fabricated on the substrate may be destroyed by the alkaline or acid solution.

Use of a pulsed Nd:YAG laser to machine silicon nitride ceramic in water is described in the article by N. Morita et al, entitled "Pulsed Laser Processing of Ceramics in Water", in Appl. Phys. Lett., vol. 52, 1965 (1988). The article states that the process is used with ceramics which sublimate and that alumina ceramics, which fundamentally have a melting point, cannot be processed without creating a recast layer.

Etching and cutting of alumina ceramic such as $Al_2O_3$—TiC causes serious problems due to the high melting temperature of the material. Previously, mechanical machining has been the only method available for microscopic patterning of the material. Recently, reactive ion etching has been shown to be useful for etching alumina ceramic. However, the use of reactive ion etching causes difficulty with the metallic film of which the thin film magnetic head is constructed and which is susceptible to corrosion damage due to the presence of reactive species. Another etching technique includes the use of an excimer laser for etching by ablation. The formation of debris and/or recast (surface crust layer) during ablation is unavoidable and may result in problems requiring additional processing steps for debris removal.

SUMMARY OF THE INVENTION

In order to overcome the shortcomings of the techniques described above, the present invention relies upon a laser induced sonic reaction for etching a substrate. The laser may be a copper vapor laser, a chopped cw argon laser, low power pulsed Nd:YAG laser or Nd:YAG laser used at low power density which provides very short pulse widths of laser energy. The substrate preferably is made of a laser energy absorbing material which has a high melting temperature and does not sublime when heated. The liquid in which the etching is performed is preferably an organic or inorganic inert liquid which at room temperature is non-reacting with the substrate and which does not absorb the applied laser energy.

The laser, as will be described, provides instantaneous heat to the substrate surface. In addition, the applied laser energy is selected to be of a predetermined repetition rate, pulse width and peak power sufficient to form laser induced microscopic gas bubbles which will implode at the substrate surface to remove material. The applied laser energy is simultaneously selected to avoid the formation of large stable bubbles and the formation of lava or cracks in the substrate. The preferred liquid is water. However, other liquids such as aliphatic and aromatic series organics, alcohols and the like can be used. The substrate material must absorb the laser energy, have a finite melting temperature and not sublime when the laser energy is applied. Exemplary substrate materials are $Al_2O_3$—TiC ceramic, ferrites, titanium carbide, silicon carbide, silicon or silicon oxide covered silicon, ferrites and other laser energy absorbing oxides.

The present invention has particularly applicability in the manufacture of magnetic head bearing sliders where simultaneous etching of the ceramic substrate and the usually present thick alumina overcoat must take place. Moreover, when etching slider material ($Al_2O_3$—TiC) with a thin film head constructed on it, thin metal pole tips, usually NiFe, or magneto-resistive stripes (MnFe/NiFe which can be subject to corrosion even in water), a thin layer of paraffin, AZ resist novolac family resists, or other similar readily meltable or readily removable film is applied to protect the entire slider. Since the paraffin and novolac resists are transparent to the laser beam, they do not interfere with the laser-sonic etching mechanism of $Al_2O_3$—TiC.

Magnetic head assemblies are generally manufactured in a large array of heads fabricated on a single substrate. The present etching method due to its highly directional nature provides also a speedy method for dicing, cutting or separating the individual head assemblies in the array. Such separating has heretofore been accomplished by using a mechanical saw which is a time consuming process generating a large degree of particulate contamination.

A principal object of the present invention is therefore, the provision of a method of and apparatus for laser assisted, sonic induced etching of a substrate disposed in an inert liquid.

A further object of the invention is the provision of a method of laser etching rails in an $Al_2O_3$—TiC ceramic or ferrite substrate.

A still further object of the invention is the provision of a method of etching a substrate in an inert liquid by laser induced sonic cavitation.

Another object of the invention is the provision of a method of laser etching of rails in a magnetic head bearing slider.

Further and still other objects of the invention will become more clearly apparent when the following description is read in conjunction with the accompanying drawings.

DETAILED DESCRIPTION

Figure 1:
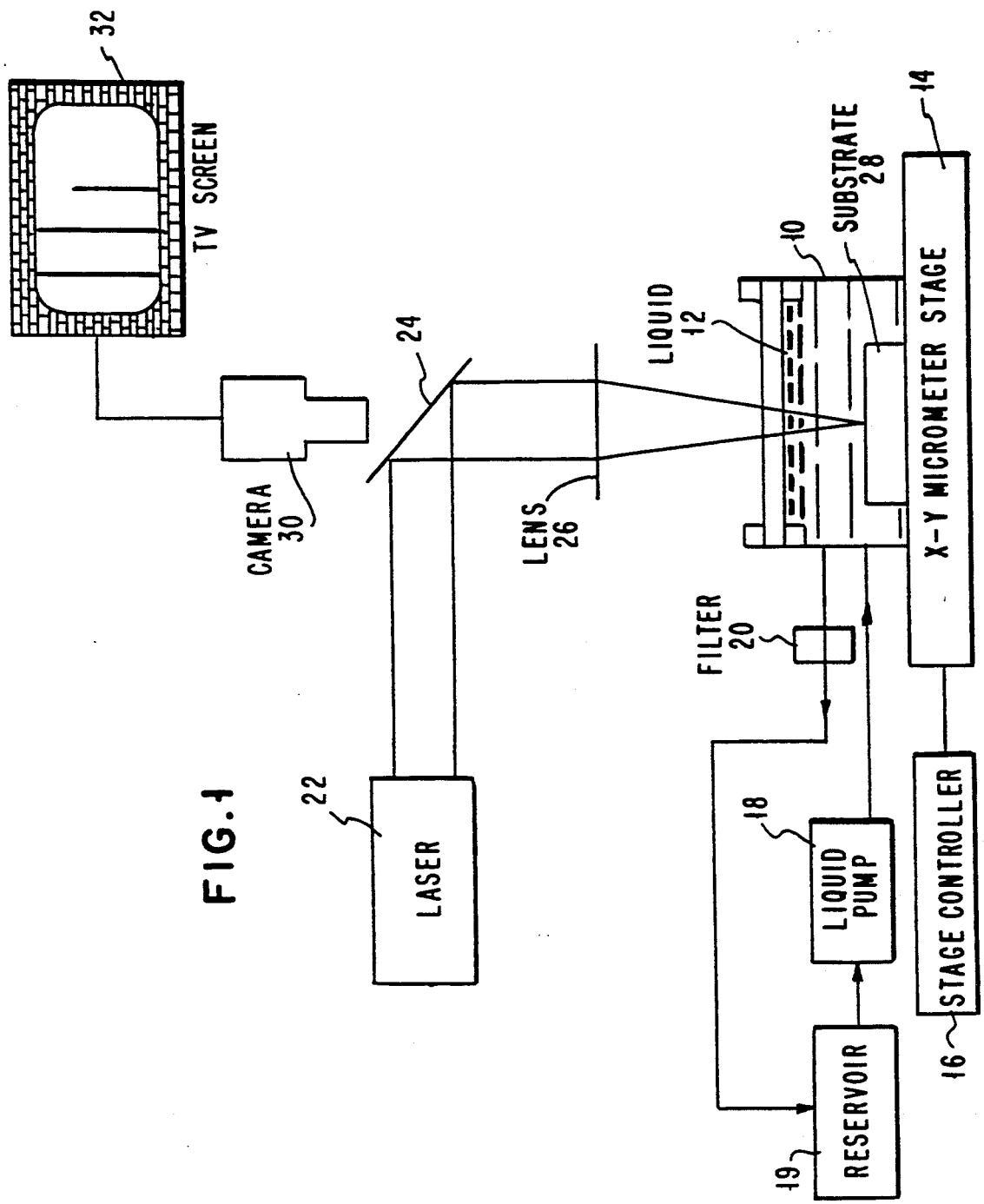
FIG. 1 is a preferred embodiment for practicing the present invention.

Referring now to the figures and to FIG. 1 in particular, there is shown a preferred embodiment for practicing the present invention. A container 10, filled with a liquid 12, is disposed on and coupled to an x-y micrometer stage 14 which undergoes linear translating motion responsive to a stage controller 16 coupled to the stage 14. The liquid 12 is recirculated through a filter 20, into reservoir 19 and is returned into the etching container 10 by means of pump 18.

A laser 22, such as a copper vapor laser, chopped beam of a cw argon ion laser or pulsed YAG laser operating a low power density to avoid the formation of a recast layer or the like, transmits laser energy to a reflector 24 which reflects the laser beams through a collimation lens 26 into the liquid 12 in container 10. The lens 26 focuses the laser beam onto the surface of a substrate 28 disposed in the liquid 12 inside container 10.

A camera 30 is disposed for providing pictures of the etching of the substrate surface to a TV screen 32 for viewing.

The substrate material is laser energy absorbing and has a finite melting temperature and does not sublime when heated. Exemplary substrate materials are $Al_2O_3$—TiC ceramic, ferrites, titanium carbide, silicon carbide, silicon or silicon oxide covered silicon and other laser energy absorbing oxides. The liquid is an organic or inorganic liquid which preferably does not chemically react with the substrate and which does not absorb the applied laser energy. The liquid may be water, Freon (liquid fluorocarbon or liquid chlorofluorocarbon), an aliphatic or aromatic hydrocarbon or an inert liquid. When the liquid is one which chemically reacts with the substrate, the laser energy is adjusted for inducing sonic cavitation. However, enhanced chemical etching will also occur.

In operation, a laser beam is transmitted from fixed laser 22 towards reflector 24 where the beam is reflected through collimating lens 26. The laser beam is focused to a small spot on the surface of a substrate 28 located in the liquid filled container 10 disposed on and coupled to x-y micrometer stage 14. The stage and hence substrate 28 undergo linear translating motion in the x-y plane, normal to the axis of the laser beam, responsive to signals from stage controller 16. The controller 16 determines the direction and scan speed of the substrate 28 relative to the laser beam. The material follows a path in the laser energy beam where etching is to occur. The scan speed and the laser fluence (power density) determines the depth of the etch.

The repetition rate, pulse width and peak power of laser 22 are selected for forming microscopic size relatively unstable bubbles which tend to collapse (implode) every time the laser pulse is terminated at the surface of substrate 28 without forming lava or cracks in the substrate or forming large stable bubbles in the liquid 12 which would stay on the surface thus obscuring and shadowing the surface from the laser beam or alternatively defocussing or deflecting the laser beam.

The etching takes place due to laser induced sonic cavitation at the solid/liquid interface resulting from local momentary heating of the substrate surface, flash evaporation of the liquid and the formation and collapse of liquid vapor bubbles which induce strong "hammering action" against the solid surface and thereby erosion and cavitation of the substrate material. As the hot grains of the substrate material are eroded away from the surface by the laser-sonic cavitation, the grains are instantly quenched by the liquid 12 before there is an opportunity for them to fuse to the edges of the groove or rail being etched. The quenched particles formed during laser etching are carried away by the flowing liquid past the surface and are trapped in filter 20 during recirculation of the liquid. The somewhat granular appearance near the edges and at the bottom of the trenches is believed to be a result of grain pull out rather than redeposition of the removed hot material. The described mechanism differs from laser ablation in air where molten lava is formed and spitting of lava droplets results in redeposition of fused hot particles on the surfaces not being irradiated by the laser during etching.

In a preferred embodiment of the invention, a copper vapor laser operating at wavelengths of 511 and 578 nm provides, after passing through lens 26, a relatively large area beam of approximately 3 to 4 cm with an average power in the range of approximately 30 to 40 watts, a peak power of approximately 250 kilowatts, short pulse width of approximately 20 to 30 nanoseconds and high repetition rate in the range of approximately 5 to 10 kHz. These laser parameter values make the copper vapor laser well suited for etching of high melting temperature materials, including $Al_2O_3$—TiC and ferrites in water.

Figure 2:
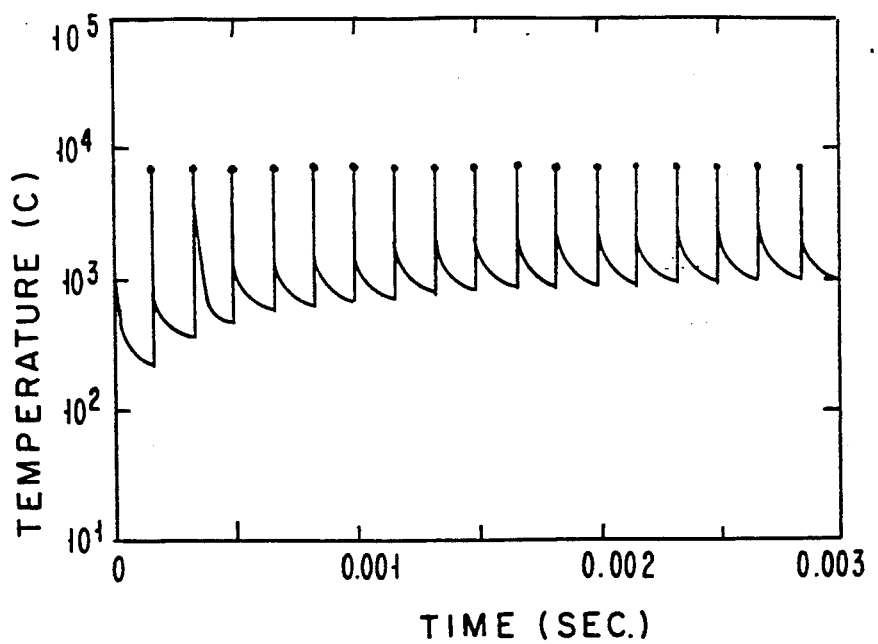
FIG. 2 is a graphical representation of the surface temperature variation produced by a laser.

The temperature distribution as a function of time, produced on a ferrfite surface heated by a copper vapor laser operating at 6 kHz and 2.1 $J/cm^2$ laser energy per pulse, oscillates between a high temperature and a low temperature during each laser pulse as shown in FIG. 2.

Copper vapor lasers differ from argon ion lasers used heretofore in certain applications for etching because of the higher instantaneous temperatures reached by the copper vapor laser. The use of short laser pulses, typically less than 30 ns, does not provide sufficient time for large stable bubbles to form at the etched surface of the substrate. However, the laser provides sufficient energy for microscopic size bubbles to form and collapse to erode the surface. The laser induces cavitation in an inert liquid, such as water, thereby obviates the need for a corrosive etching solution. In many application, a chopped beam cw argon ion laser or a YAG laser operating at a low power density (fluence) can be used for etching according to the present invention.

Figure 3:
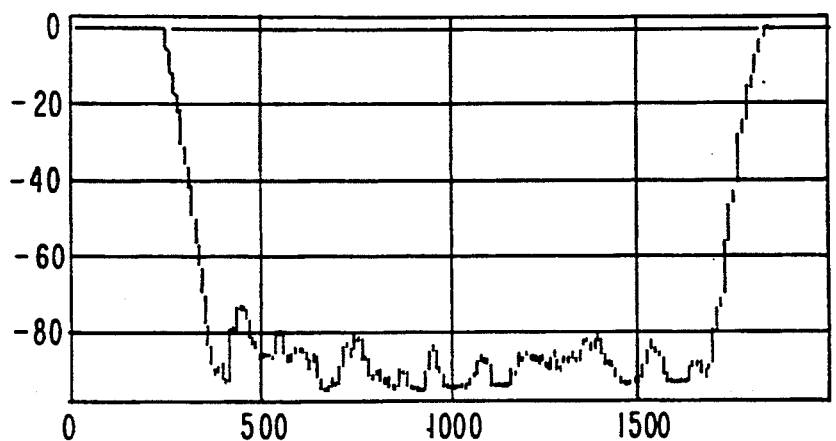
FIG. 3 is a greatly magnified graphical representation of a cross-section profile of an etched rail.

In order to achieve the etching of a 1 mm wide rail or groove, a laser beam having a beam width of approximately 100 $\mu$m is repetitively scanned in an overlapping pattern. The rail depth is dependent upon the overlap distance, scan speed and laser power. FIG. 3 illustrates the depth profile of one groove etched in $Al_2O_3$—TiC substrate at a 0.1 cm/second scan speed with a laser power of 5 watts. By proper adjustment of the scan speed and laser power, the substrate can be diced and separated. The figure shows an absence of a recast layer or cracks at the surface.

Figure 4:
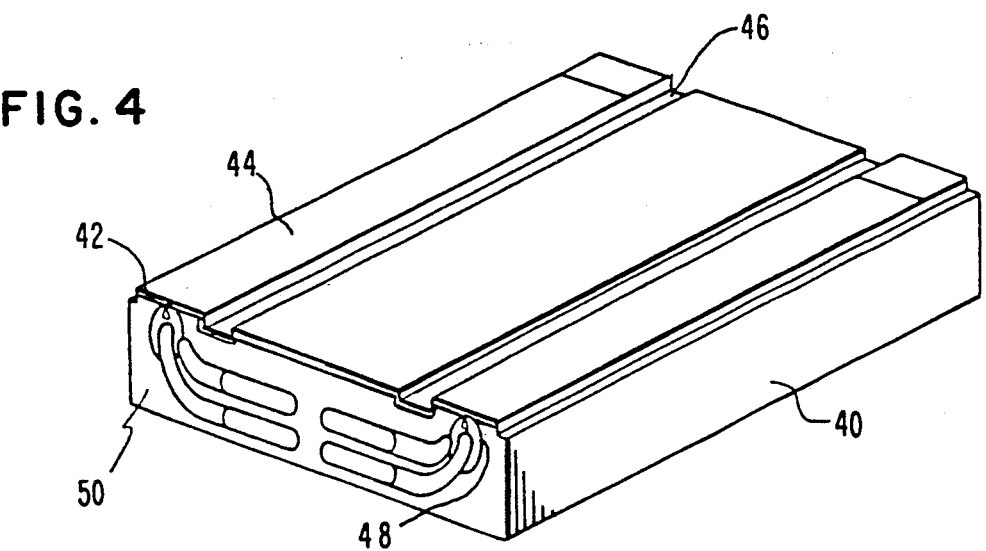
FIG. 4 is a perspective view of a magnetic slider carrying thin film heads in accordance with the present invention.

One important application of the present invention is the etching of thin film head bearing sliders. Referring to FIG. 4, thin film head bearing sliders are currently fabricated from $Al_2O_3$—TiC on which thin film heads comprising, copper coil, permalloy yokes, and Ni-Fe/MnFe magnetoresistive elements are deposited. The thin film head 48 is overcoated with $Al_2O_3$. For instance, $Al_2O_3$—TiC ceramic is coated with a thick, 30 $\mu$m, alumina overcoat 42 applied on the head 48 and top surface 50 of the slider. While the copper vapor laser etches the ceramic 40, because of the non-absorbing character of the alumina, the laser fails to etch the alumina 42, 50. However, when the layer of alumina is placed in contact with a laser energy absorbing layer, the etching of the alumina overcoat and ceramic along rail 46 is easily accomplished. Preferred absorbing layers are metallic paint (such as silver, gold, cobalt, nickel and aluminum), a thin layer of metal such as NiFe, $Al_2O_3$—TiC ceramic, or a thin film of any other absorbing metal. The absorbing layer can be applied or deposited on top of the alumina layer, between the alumina layer and ceramic substrate or embedded within the alumina.

Laser energy can be applied at an angle to the alumina area where etching is to occur. The laser energy then sufficiently heats the absorbing layer to generate heat at the solid/liquid interface in the container 10 which is adequate to form and collapse water vapor bubbles approximately at a sonic rate.

Magnetic head bearing sliders of the type described are usually fabricated in large arrays on a single $Al_2O_3$—TiC substrate. By proper adjustment of the laser energy, pulse width and scanning speed, the individual slider heads can quickly and easily be separated from the array.

In order to avoid any possible adhesion of even quenched debris to the rails and any possible corrosion of thin metal pole tips and/or magneto-resistive (MR) stripes (MnFe/NiFe) by the liquid, a thin layer of paraffin, AZ novalate resin resist or any other similar readily meltable material which is subsequently readily removable is applied in a thin film form to the entire slider by dipping, spinning, spraying or any other similar means to provide temporary corrosion protection. Since the paraffin is transparent to the laser energy, it does not affect the etching mechanism. As the laser beam heats the substrate surface, the paraffin melts and pulls away from the rail where there is local heating thus resulting in selective removal of the temporary mask without use of additional process steps. The inert liquid or water quickly freezes the molten paraffin. The opening in the paraffin is only as wide as the laser beam and any redeposit or static attraction, if any, will occur on top of the paraffin. The rails are thus protected from any possible redeposition of debris. Concurrently, the paraffin protects the head from corrosion by the liquid. Paraffin is readily removed by an aromatic solvent, benzene or many other organic solvents which does not etch attack or otherwise affect the exposed air bearing surface of the head. If AZ resist or any other similar readily meltable or readily laser removable material is used, it can be removed from the slider by a suitable solvent such as acetone, alcohol, and the like without attacking the inductive head or the MR head.

In the preferred embodiment in FIG. 1 the substrate is coupled to a movable stage and the laser is maintained stationary while the stage undergoes motion for causing the laser beam to scan the surface. At high scanning speeds such a configuration may have a limitation resulting from the motion and the defocussing of the laser beam at the surface of the substrate liquid interface. Therefore, in an alternative embodiment, the laser beam is scanned and the substrate is maintained in a fixed position. The scan speed and accuracy become more readily adjustable in case of very small dimensions when scanning the laser beam by conventional means such as vibrating mirror or similar means. The combination of scan speed adjustment and laser beam power permits etching of rails in a substrate at a predetermined depth at a high speed.

In another example the $Al_2O_3$—TiC has been substituted with ferrite and identical laser-sonic etching was observed in water.

In yet another example the $Al_2O_3$—TiC was substituted by $Si/SiO_2$ and identical etching, at much higher speeds has been observed.

While there have been described and illustrated a preferred embodiment of the present invention and modifications and variations thereof, it will be apparent to those skilled in the art that further modifications and variations are possible without deviating from the broad scope of the present invention which shall be limited solely by the scope of the claims appended hereto.

What is claimed is:

1. A laser etching method comprising the steps of:
disposing a laser energy absorbing substrate to be etched having a finite melting temperature and which does not sublime when heated into a liquid, and
scanning the substrate with a beam of laser energy at a location where etching is to occur, the characteristics of the laser energy causing the formation and collapse of liquid vapor bubbles at said location for etching the substrate.

2. The method as set forth in claim 1 wherein said substrate is of a material selected from the group consisting of $Al_2O_3$—TiC ceramic, titanium carbide, silicon, silicon carbide, silicon oxide covered silicon, ferrite and laser energy absorbing metals and metal oxides.

3. The method as set forth in claim 1 wherein said liquid is water.

4. The method as set forth in claim 3 wherein said laser is a copper vapor laser.

5. The method as set forth in claim 1 wherein said laser is a copper vapor laser.

6. The method as set forth in claim 1 wherein said laser is a cw argon ion laser chopped to produce pulsed beam laser energy.

7. The method as set forth in claim 3 wherein said laser is a cw argon ion laser chopped to produce pulsed beam laser energy.

8. The method as set forth in claim 1 wherein said laser is a YAG laser.

9. The method as set forth in claim 3 wherein said laser is a YAG laser.

10. The method as set forth in claim 1 wherein said liquid is selected from the group consisting of water, liquid fluoracarbon liquid, chlorofluorocarbon aliphatic or aromatic hydrocarbon and inert liquids.

11. The method as set forth in claim 1 wherein said scanning is moving the substrate.

12. The method as set forth in claim 1 wherein said scanning is moving the beam of laser energy.

13. The method as set forth in claim 1 wherein said scanning the substrate with a beam of laser energy cuts through the substrate.

14. The method as set forth in claim 1 further comprising coating the substrate with a protective layer in the location where etching is to occur prior to said scanning and removing said protective layer after said scanning.

15. The method as set forth in claim 14 wherein said protective layer is non-laser energy absorbing, non-reactive with the substrate, readily meltable and readily removable.

16. The method as set forth in claim 14 wherein said protective layer is selected from the group consisting of paraffin and novolac family resists.

17. The method as set forth in claim 1 wherein said liquid is non-reactive with the substrate.

18. A method of laser etching a rail in a head bearing slider comprising the steps of:
forming a magnetic head bearing slider by: providing a head slider substrate; coating said substrate with a non-laser energy absorbing layer; disposing a laser energy absorbing layer in proximity to said substrate and said non-energy absorbing layer in a region where etching is to occur;
disposing said head bearing slider into a liquid, and scanning said head bearing slider with a beam of laser energy at said region so that the substrate heats in said region at a location where the etching is to occur and liquid vapor bubbles form and collapse in said region at the location where the etching is to occur whereby a rail is etched in said head bearing slider at said location.

19. The method as set forth in claim 18 further comprising coating said magnetic head bearing slider with a protective layer prior to said scanning and removing said protective layer after said scanning.

20. The method as set forth in claim 19 wherein said protective layer is a material which is non-reactive with said head bearing slider, non-laser energy absorbing, readily meltable and readily removable.

21. The method as set forth in claim 19 wherein said protective layer is selected from the group consisting of paraffin and novolac family resists.

22. The method as set forth in claim 18 wherein said slider head bearing slider is in an array of slider heads and said scanning dices said array.

23. The method as set forth in claim 18 wherein said substrate is $Al_2O_3$—TiC ceramic, said non-laser energy absorbing layer is alumina and said laser energy absorbing layer is selected from the group consisting of metallic paint, $Al_2O_3$—TiC ceramic and a thin film of a laser energy absorbing metal.

24. A laser-etching apparatus comprising:
a container for holding a liquid into which a material to be etched is disposed;
laser means for transmitting into said container at the material to be etched a focussed laser energy beam for causing the formation and collapse of liquid vapor bubbles for etching the material; and
motive means for causing said laser and the material in said container to undergo relative motion for causing said laser energy beam to scan and etch the material at a predetermined location.

25. An apparatus as set forth in claim 24 wherein said liquid is water.

26. An apparatus as set forth in claim 25 wherein said laser means comprises a copper vapor laser.

27. An apparatus as set forth in claim 24 wherein said laser means comprises a copper vapor laser.

28. An apparatus as set forth in claim 24 wherein said laser means comprises a cw argon ion laser chopped to produce pulsed beam laser energy.

29. An apparatus as set forth in claim 25 wherein said laser means comprises a cw argon ion laser chopped to produce pulsed beam laser energy.

30. An apparatus as set forth in claim 24 wherein said laser means comprises a YAG laser.

31. An apparatus as set forth in claim 25 wherein said laser means comprises a YAG laser.

32. An apparatus as set forth in claim 24 wherein said liquid is selected from the group consisting of water liquid fluorocarbon, liquid chlorofluorcarbon, aliphatic or aromatic hydrocarbon and inert liquids.

33. An apparatus as set forth in claim 24 wherein said motive means causes the material in said container to undergo motion.

34. An apparatus as set forth in claim 24 wherein said motive means causes said laser means to undergo motion.

35. An apparatus as set forth in claim 24 wherein said laser means transmits a laser energy beam sufficient to cut through the material.

36. An apparatus as set forth in claim 24 wherein said motive means causes said laser energy beam to scan the material at a speed sufficient to cut through the material.

37. An apparatus as set forth in claim 24, wherein the material is selected from the group consisting of $Al_2O_3$—TiC ceramic, silicon, silicon carbide, ferrite and laser energy absorbing metal and metal oxides.

38. An apparatus as set forth in claim 24, further comprising means for recirculating and filtering said liquid.

39. An apparatus as set forth in claim 24, further comprising a reservoir for storing and cooling said liquid.

40. An apparatus as set forth in claim 24, further comprising means for viewing etching of the material.

41. An apparatus as set forth in claim 24 wherein said motive means comprises an x-y stage.

42. An apparatus as set forth in claim 24 wherein the liquid is non-reactive with the substrate.

* * * * *